(12) United States Patent
Kim et al.

(10) Patent No.: US 7,422,380 B2
(45) Date of Patent: Sep. 9, 2008

(54) CAMERA DOOR OPENING/SHUTTING APPARATUS FOR PORTABLE TERMINAL

(75) Inventors: Hee-Kwan Kim, Suwon-si (KR); Seung-Woo Lim, Seoul (KR); Jung-Nam Moon, Seoul (KR); Hyon-Myong Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 480 days.

(21) Appl. No.: 11/166,011

(22) Filed: Jun. 24, 2005

(65) Prior Publication Data
US 2006/0034605 A1 Feb. 16, 2006

(30) Foreign Application Priority Data
Aug. 16, 2004 (KR) ...................... 10-2004-0064234

(51) Int. Cl.
*G03B 17/00* (2006.01)
*H04N 5/00* (2006.01)
(52) U.S. Cl. .................................. 396/448; 348/E5.035
(58) Field of Classification Search ................... 396/84, 396/322, 406, 448, 63, 89, 408; 348/E5.025
See application file for complete search history.

(56) References Cited

U.S. PATENT DOCUMENTS 4,847,648 A * 7/1989 Yamaguchi et al. ........... 396/84

FOREIGN PATENT DOCUMENTS

JP 2003-125051 4/2003

* cited by examiner

*Primary Examiner*—Melissa Jan Koval
(74) *Attorney, Agent, or Firm*—The Farrell Law Firm, PC

(57) ABSTRACT

A camera door opening/shutting apparatus for a portable terminal equipped with a camera lens capable of semi-automatically opening and shutting the camera door of a portable terminal. The apparatus has a door member having a lens hole formed therein, a camera door adapted to open and shut the lens hole, a first door cam providing the rotation axis and a trough, the first door cam extending along the periphery of the camera door and being rotatably connected to the door member, a second door cam having a crest formed thereon, which faces the trough, and being adapted to travel linearly as the first door cam is rotated, a door elastic body; and a door cover having an opening formed therein.

19 Claims, 15 Drawing Sheets ately depending on the type of the apparatus. For example, the

CAMERA DOOR OPENING/SHUTTING APPARATUS FOR PORTABLE TERMINAL

This application claims priority to an application entitled "Camera Door Opening/Shutting Apparatus For Portable Terminal" filed with the Korean Intellectual Property Office on Aug. 16, 2004 and assigned Ser. No. 2004-64234, the contents of which are hereby incorporated by reference.

BACKGROUND OF THE INVENTION

1. Field of the Invention

The present invention relates to a camera door opening/shutting apparatus for a portable terminal, and more particularly to a camera door opening/shutting apparatus for a portable terminal capable of semi-automatically opening and shutting the camera door of a portable terminal.

2. Description of the Related Art

In general, a "portable communication apparatus" refers to an apparatus which a user can carry with him to perform wireless communication with a desired partner. Portable communication terminals include HHPs, CT-2 cellular phones, digital phones, PCS phones, and PDAs and may be classified into various categories according to their appearance, such as bar-type apparatuses, flip-type apparatuses, and folder-type apparatuses. The bar-type apparatuses have a single housing shaped like a bar. The flip-type apparatuses have a flip or a cover which is rotatably coupled to a bar-shaped housing by a hinge device. The folder-type apparatuses have a folder which is connected to a single bar-shaped housing by a hinge device in such a manner that the folder can be rotated to fold on or unfold away from the housing.

For video communication, conventional portable communication apparatuses are equipped with a camera lens as a photographing means, which is used to perform video communication with a desired partner or to photograph a desired object.

Recent portable communication apparatuses which are mainly used for voice communication or video communication are flip-type or folder-type apparatuses in many cases. Flip-type or folder-type apparatuses, which have prevailed recently in the market, have excellent sound sensitivity and are advantageously made in a compact size and reduced weight. The camera lens is generally mounted either on the body of flip-type apparatuses or on the hinge device on the folder of folder-type apparatuses. A camera phone, which is equipped with such a camera lens, can be carried conveniently to take still images or motion pictures with the lens.

However, conventional camera phones have a problem in that the surface of their camera lens is easily contaminated by dust or alien substances and any still images or motion pictures, which are taken in such a state, may be unclear.

In addition, conventional camera phones use a small camera and the hole of the lens surface is very small. This makes it difficult to remove alien substances from the lens.

Conventional camera phones may also cause another person to be unaware that they are being surreptitiously photographed, because the camera lens is always open.

In an attempt to solve the above problems, a door opening/shutting apparatus has been positioned in the lens hole and is rotated by a hinge unit to open and shut. However, the door opening/shutting apparatus has a problem in that a user must manually rotate the door to open and shut it. This makes using the camera phones of portable communication apparatuses inconvenient.

SUMMARY OF THE INVENTION

Accordingly, the present invention has been made to solve the above-mentioned problems occurring in the prior art, and an object of the present invention is to provide a camera door opening/shutting apparatus for a portable terminal making it possible to easily open and shut the camera door of a portable terminal.

Another object of the present invention is to provide a camera door opening/shutting apparatus for a portable terminal capable of semi-automatically opening and shutting the camera door of a portable terminal in order to improve the service of the terminal, to protect the camera lens, and to prevent dust or alien substances from adhering to the surface of the camera lens.

Still another object of the present invention is to provide a camera door opening/shutting apparatus for a portable terminal capable of semi-automatically opening and shutting the camera door of a portable terminal when the terminal is used in a photographing mode in order to avoid any possibility of causing another person to misunderstand that he is being surreptitiously photographed by shutting the camera lens when not in use.

In order to accomplish this object, there is provided a camera door opening/shutting apparatus for a portable terminal equipped with a camera lens, the apparatus including a door member having a lens hole formed therein; a camera door positioned in the door member and adapted to open and shut the lens hole as being rotated about a rotation axis; a first door cam providing the rotation axis and a trough, the first door cam extending along the periphery of the camera door and being rotatably connected to the door member; a second door cam having a crest formed thereon, facing the trough, and adapted to travel linearly as the first door cam is rotated; a door elastic body providing an elastic force so that the second door cam can travel linearly while being pressed toward the first door cam; and a door cover positioned on top of the door member and having an opening formed therein in such a manner that the camera door can extend through it while being able to be rotated.

In accordance with another aspect of the present invention, there is provided a camera door opening/shutting apparatus for a portable terminal equipped with a camera lens, the apparatus including a door member having a lens hole formed therein; a camera door positioned in the door member and adapted to open and shut the lens hole as being rotated about a rotation axis; a rotation cam providing the rotation axis, the rotation cam extending along the periphery of the camera door and being rotatably connected to the door member; a link cam connected to the rotation cam by a link bar and adapted to linearly travel as the link bar is rotated by the rotation of the rotation cam; a door elastic body providing an elastic force so that the link cam can travel linearly while being pressed toward the rotation cam; and a door cover positioned on top of the door member and having an opening formed therein in such a manner the camera door can extend through it while being able to be rotated.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
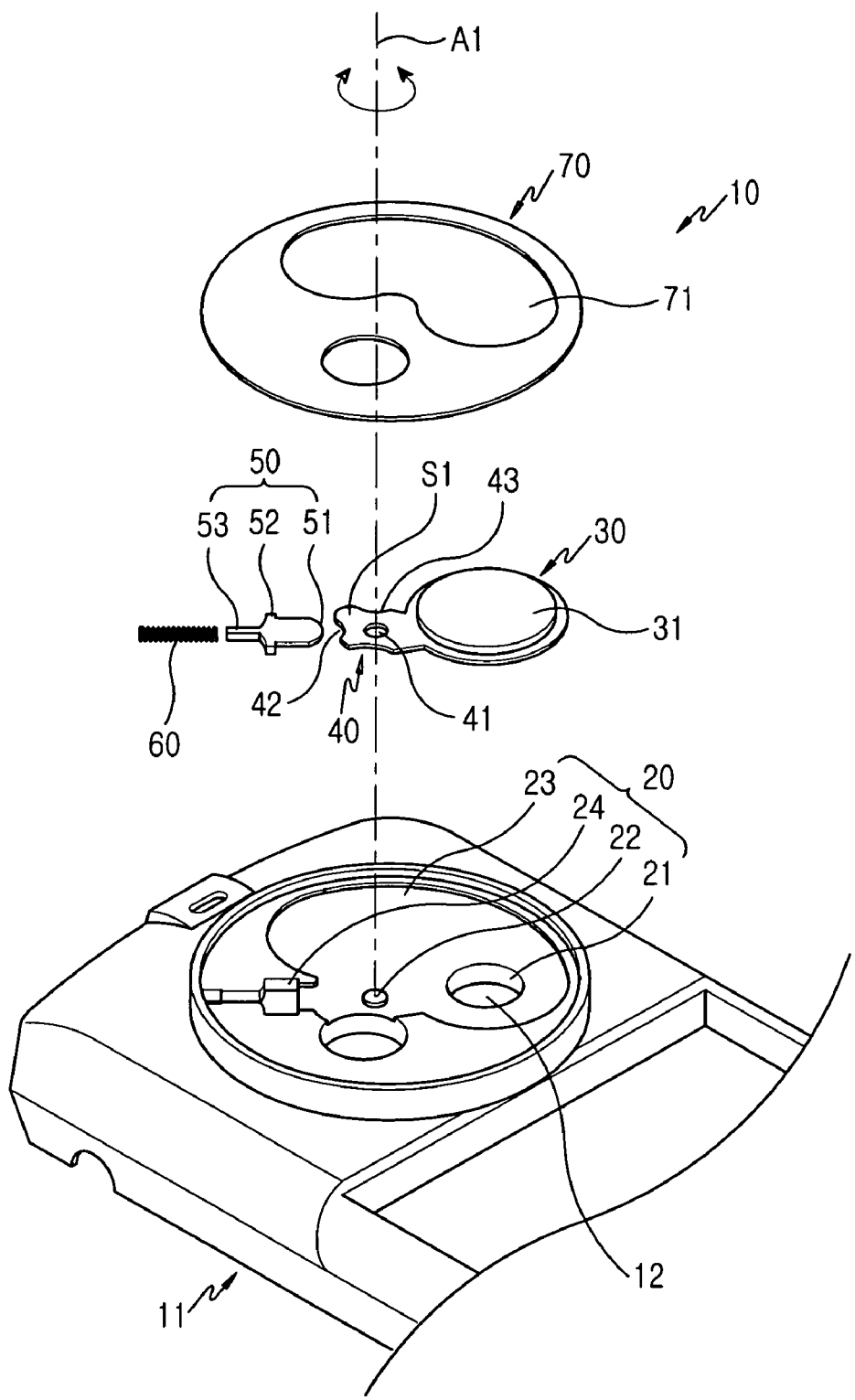
FIG. 1 is an exploded perspective view showing a camera door opening/shutting apparatus for a portable terminal according to a first embodiment of the present invention.
Figure 2:
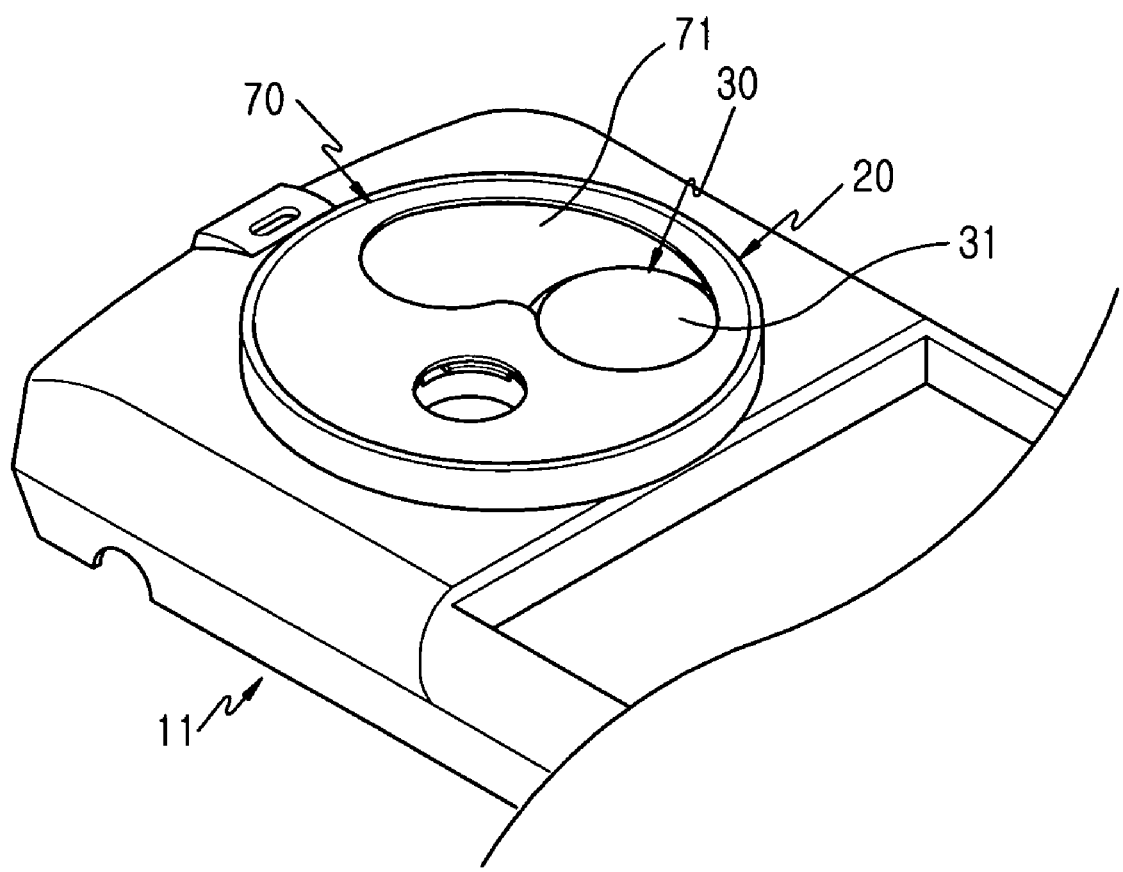
FIG. 2 is an assembled perspective view showing a camera door opening/shutting apparatus for a portable terminal according to a first embodiment of the present invention.

Hereinafter, a first preferred embodiment of the present invention will be described with reference to the accompanying drawings. In the following description of the present invention, a detailed description of known functions and configurations incorporated herein will be omitted when it may make the subject matter of the present invention unclear.

As shown in FIGS. 1 to 8, a camera door opening/shutting apparatus 10 for a portable terminal according to a first preferred embodiment of the present invention includes a door member 20, a camera door 30, first and second door cams 40 and 50, a door elastic body 60, and a door cover 70. The door member 20 has a lens hole 21 formed therein and is integral with the terminal 11 for successive coupling with the camera door 30, the first and second door cams 40 and 50, the door elastic body 60, and the door cover 70. The first door cam 40 provides a rotation axis A1 and troughs 42 and 43. The first door cam 40 extends along the periphery of the camera door 30 and is positioned in a rotation space 23 of the door member 20 in such a manner that it can be rotatably connected thereto. The second door cam 50 has a crest 51, which faces the trough 42, and is positioned in a containing space of the door member 20 in such a manner that it can travel linearly as the first door cam 40 is rotated. The door elastic body 60 is positioned in the containing space of the door member 20 and provides an elastic force so that the second door cam 50 can travel linearly while being pressed against the first door cam 40. The door cover 70 is positioned on top of the door member 20 in such a manner the camera door 30 can extend through it while being able to be rotated.

As shown in FIG. 1, the door cover 70 has an opening 71 formed along the periphery of the door cover 70 in a curved shape so that the camera door 30 can be rotated therein.

Figure 3:
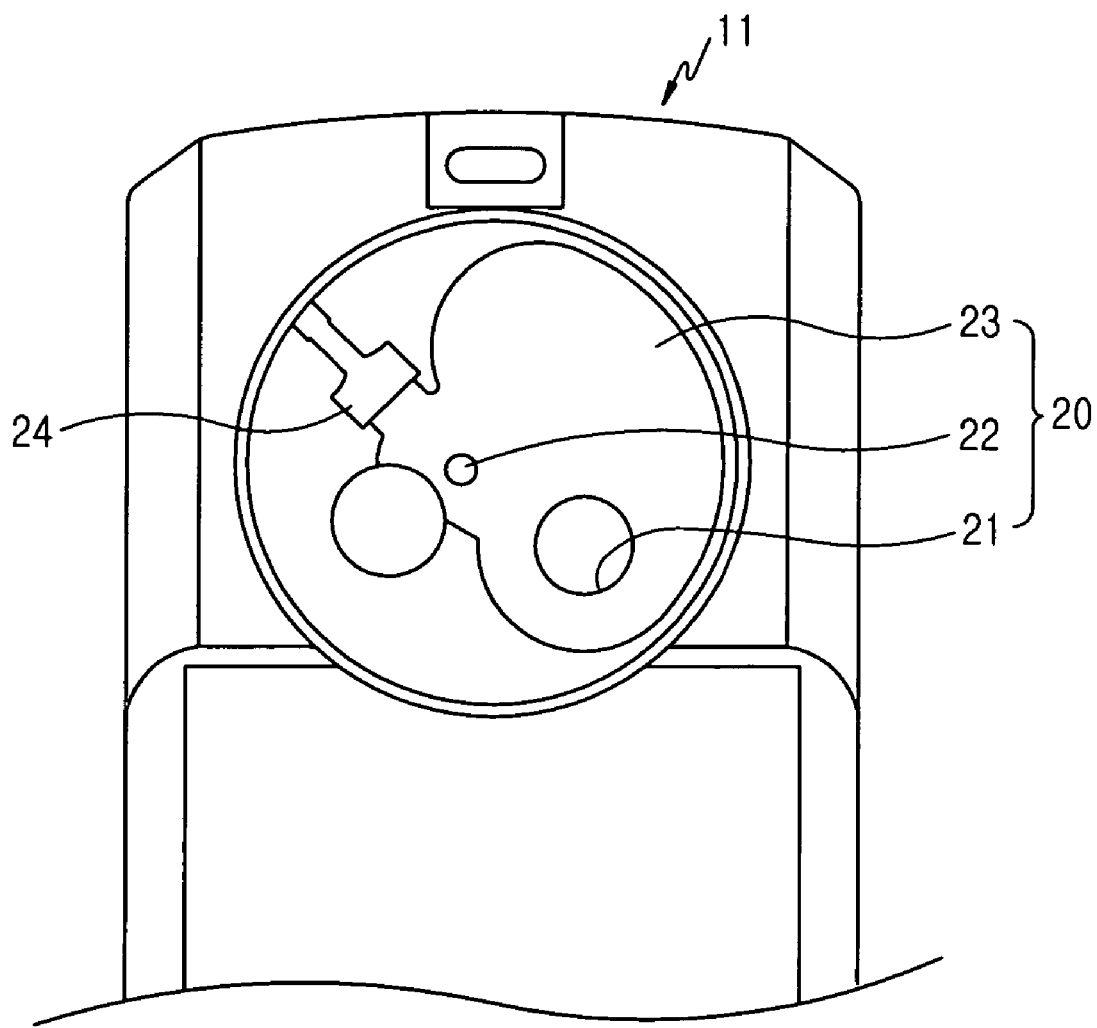
FIG. 3 is a top view showing the interior of a door member of a camera door opening/shutting apparatus for a portable terminal according to a first embodiment of the present invention.

As shown in FIGS. 1 and 3, the door member 20 has a radial shape and has a rotation protrusion 22 formed at the center thereof for rotatably coupling with a rotation hole 41 formed in the first door cam 40. The door member 20 has a rotation space 23 formed in the interior thereof for rotatably containing the camera door 30 and the first door cam 40 therein and a containing space 24 formed adjacently to the rotation space 23 for containing the second door cam 50 therein.

Figure 4:
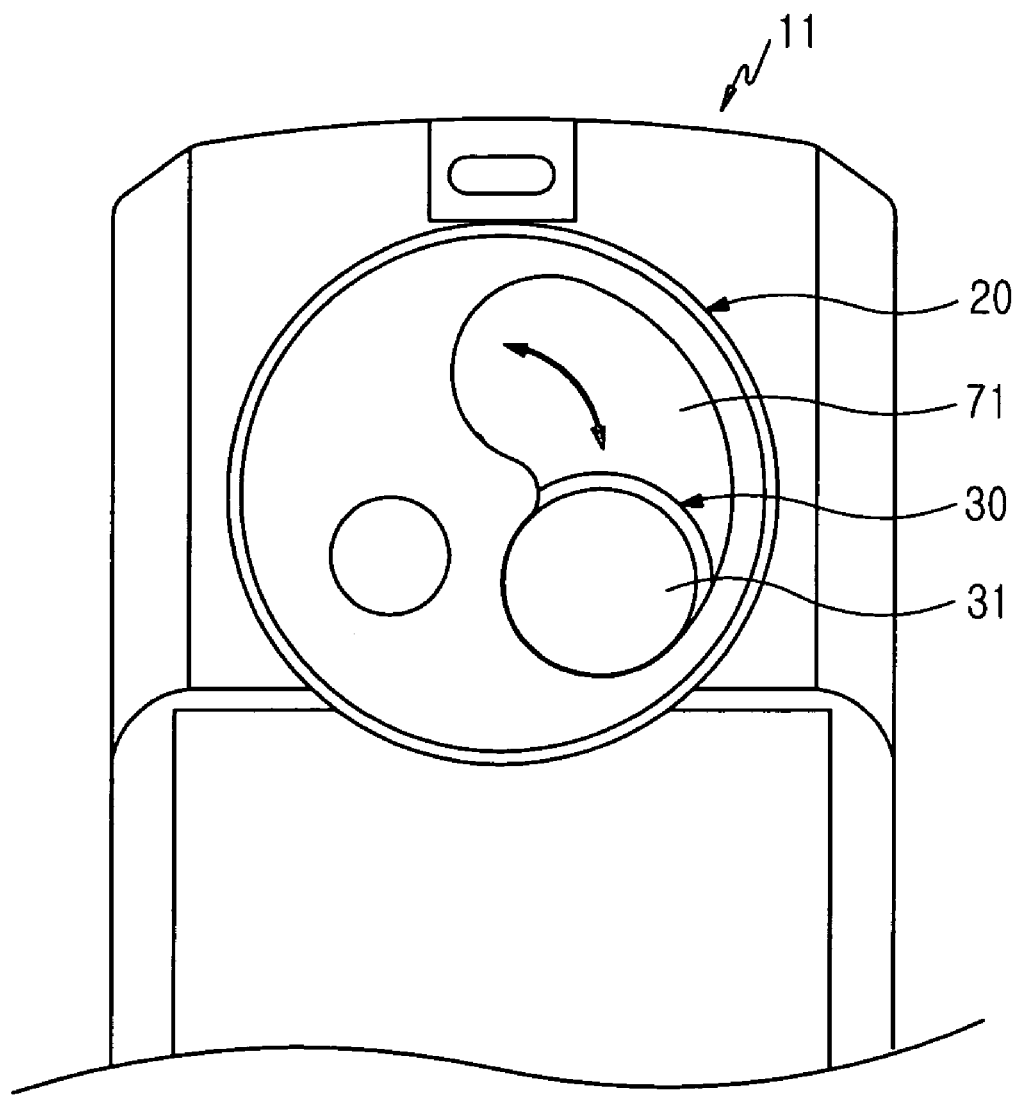
FIG. 4 is a top view showing the construction of a camera door opening/shutting apparatus for a portable terminal according to a first embodiment of the present invention prior to the operation of a camera door.

As shown in FIG. 4, the camera door 30 has a reflection plate 31 formed on the external surface thereof, which acts as a mirror.

Figure 5:
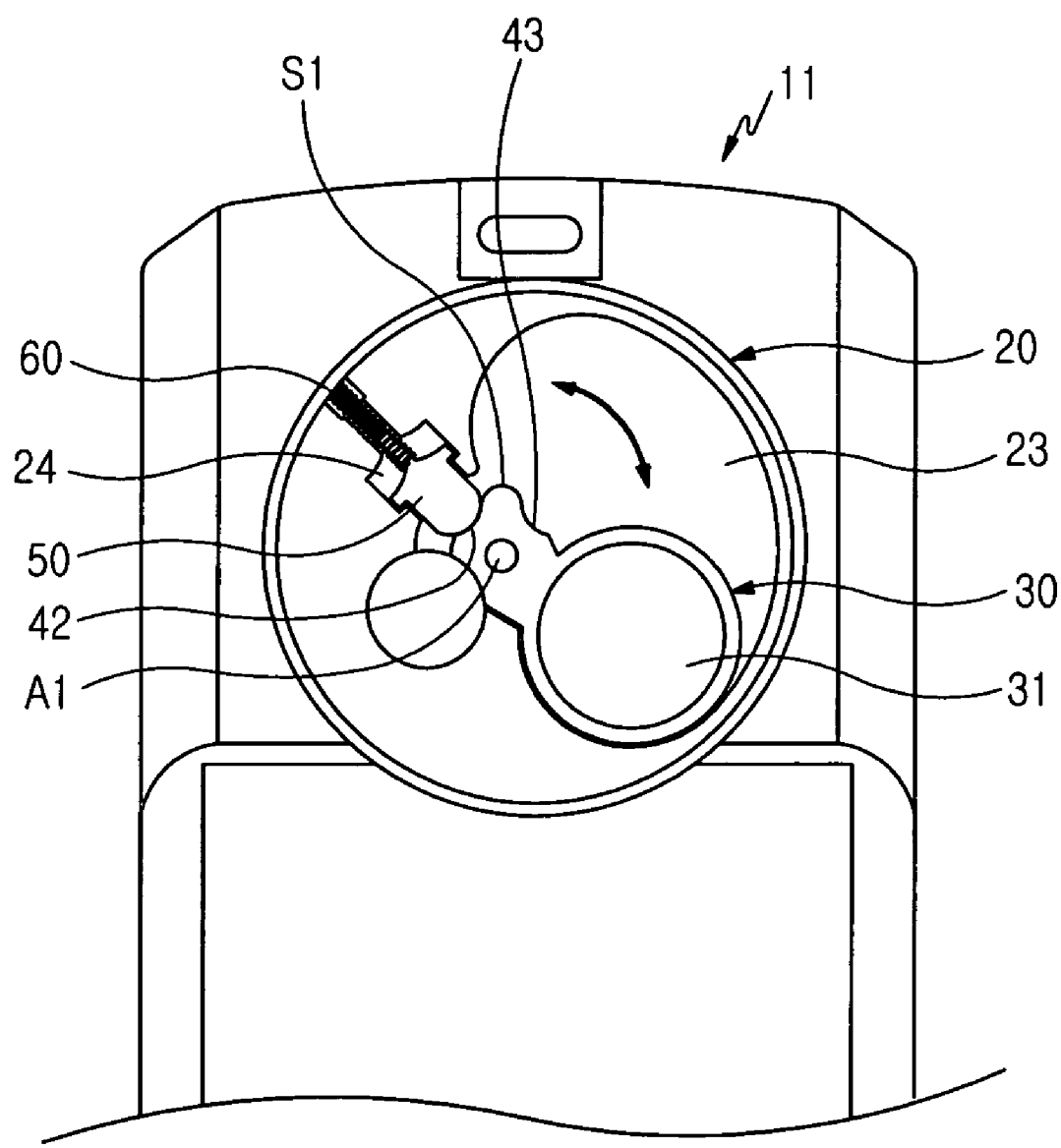
FIG. 5 is a top view showing the construction of a camera door opening/shutting apparatus for a portable terminal according to a first embodiment of the present invention prior to the opening/shutting of a lens hole by a camera door while a door cover is separated.
Figure 6:
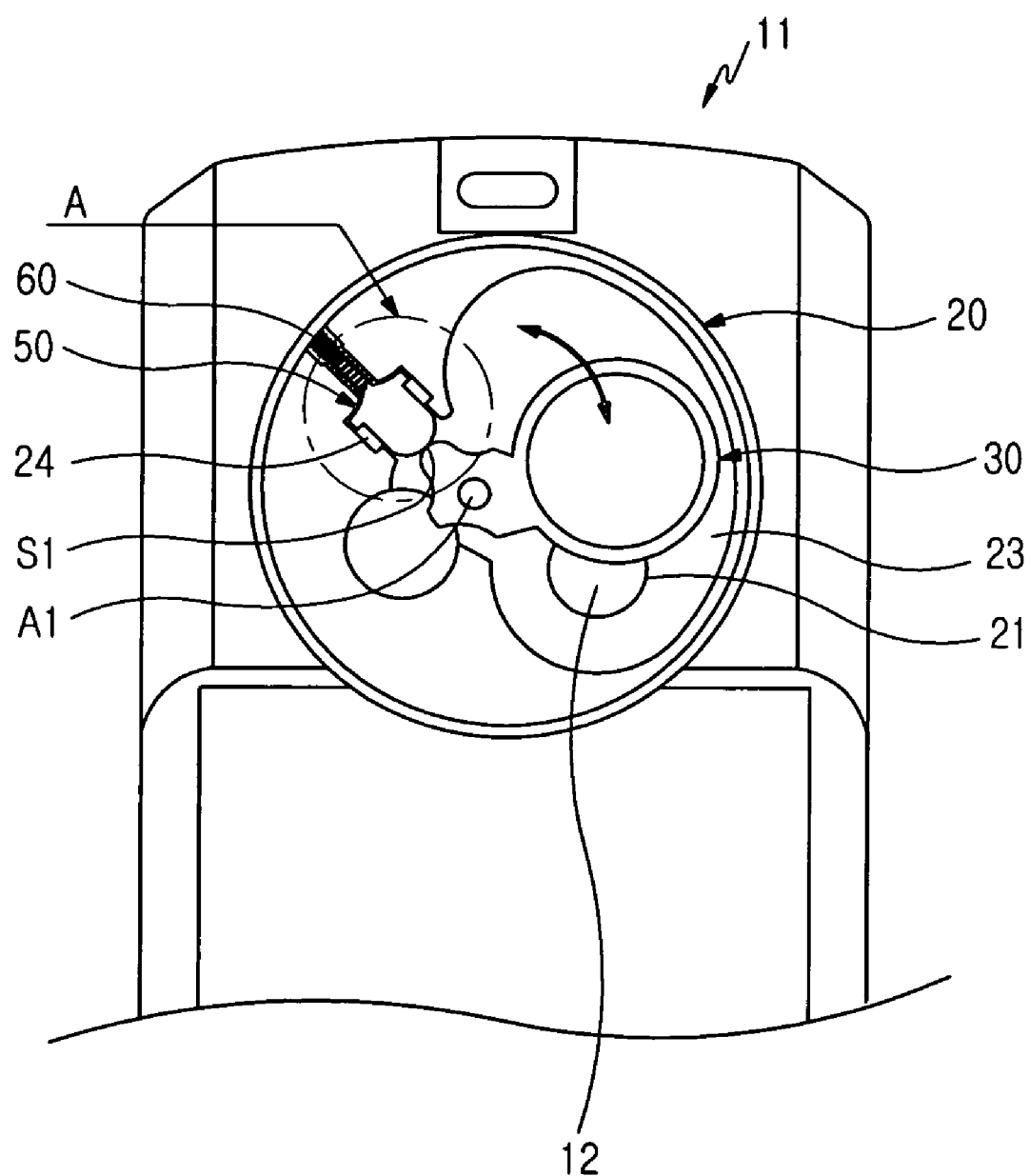
FIG. 6 is a top view showing the construction of a camera door opening/shutting apparatus for a portable terminal according to a first embodiment of the present invention during the opening/shutting of a lens hole by a camera door.
Figure 7:
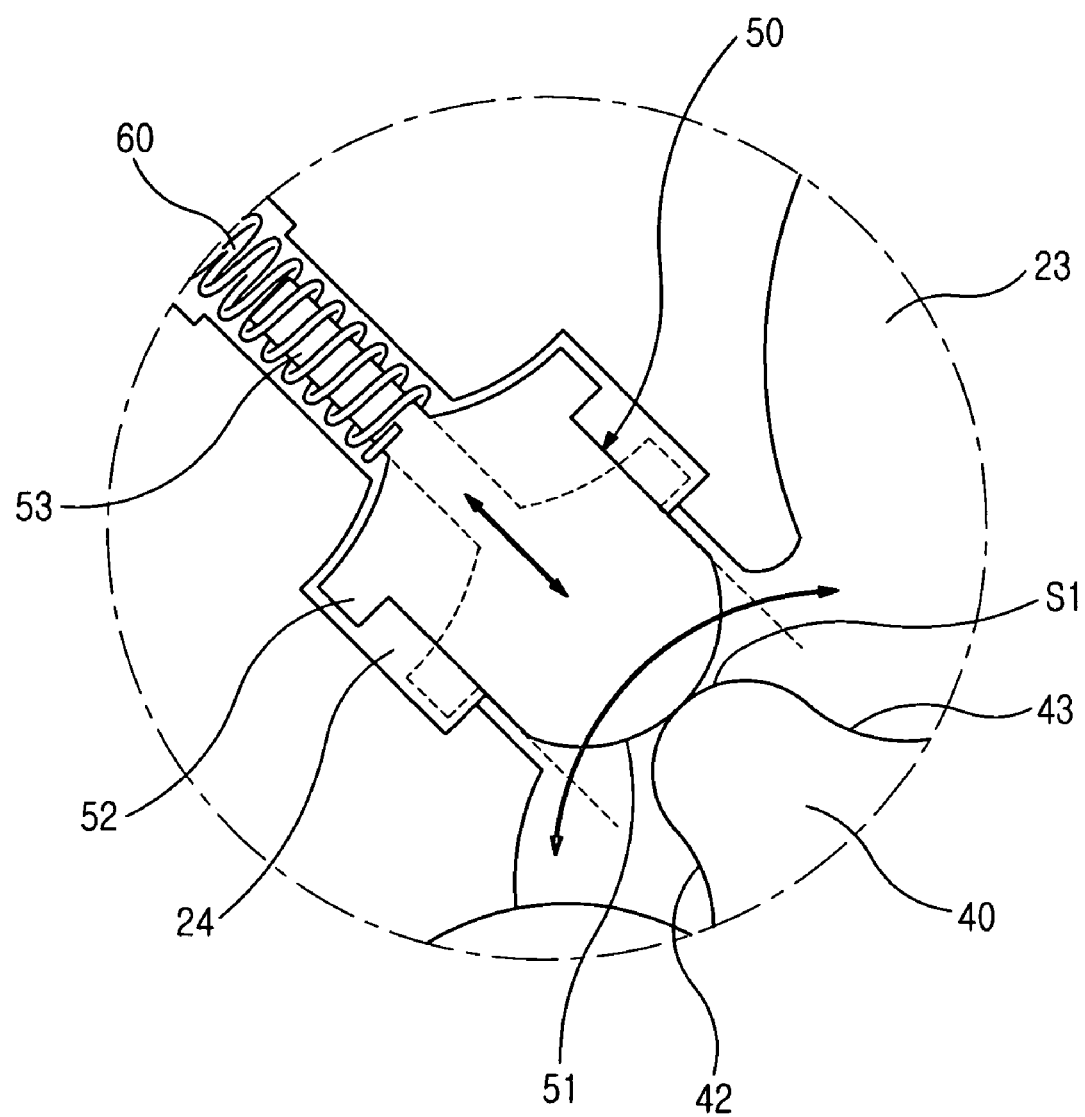
FIG. 7 is a top view magnifying part A of FIG. 6.

As shown in FIGS. 5 to 8, the first door cam 40 has a rotation hole 41 and first and second troughs 42 and 43. The rotation hole 41 is positioned at the center of the first door cam 40 to be coupled with the rotation protrusion 22 of the door member 20. As shown in FIG. 7, the first and second troughs 42 and 43 face the crest 51 and are positioned along the outer periphery of the rotation hole 41 in order to semi-automatically rotate the camera door 30 as the first door cam 40 is rotated.

As shown in FIG. 7, a bent point S1, which is formed by curvature, is defined between the first and second troughs 42 and 43. The second door cam 50 has an escape prevention step 52 formed on each lateral surface thereof to prevent it from escaping from the containing space 24 and a support protrusion 53 formed on an end thereof to support the door elastic body 60.

The operation of the camera door opening/shutting apparatus for a portable terminal according to a first embodiment of the present invention, configured as above, will now be described in detail with reference to FIGS. 1 to 8.

When the terminal 11 is used in the photographing mode, the camera door 30 of the camera door opening/shutting apparatus 10 of a portable terminal is rotated about the rotation axis A1 of the first door cam 40 as shown in FIG. 3. The first door cam 40 is then rotated together with the camera door 30 as shown in FIG. 7. After being released from the first trough 42 of the first door cam 40, the crest 51 of the second door cam 50 is inserted into the containing space 24 of the second door cam 50 and travels linearly, as shown in FIGS. 6 and 7.

Figure 8:
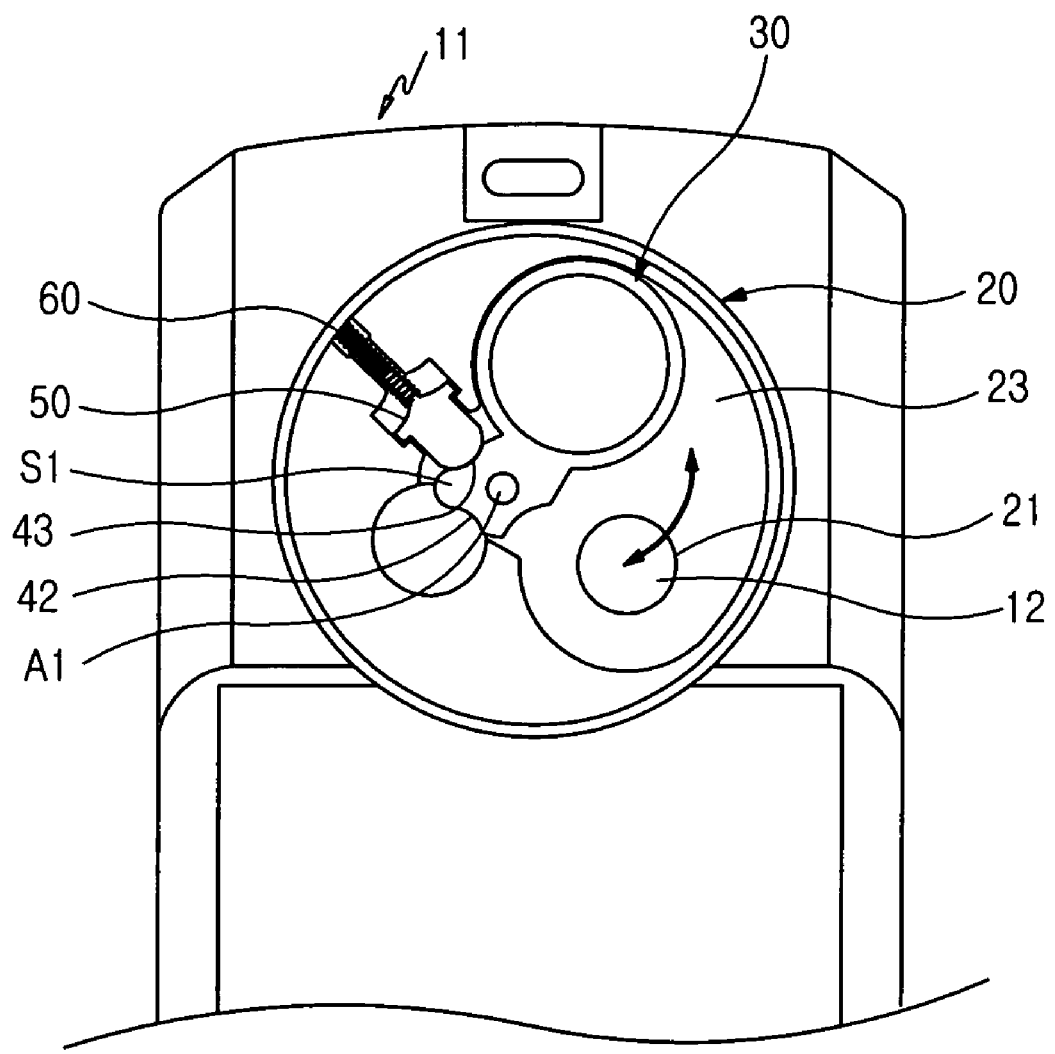
FIG. 8 is a top view showing the construction of a camera door opening/shutting apparatus for a portable terminal according to a first embodiment of the present invention after the opening/shutting of a lens hole by a camera door.

When the crest 51 reaches the bent point S1 of curvature and passes along the curvature of the bent point S1 as shown in FIG. 7, the door elastic body 60 positioned in the containing space 24 provides an elastic force so that the second door cam 50 is pressed toward the first door cam 40 and travels linearly. As the crest 51 is inserted into the second trough 43 of the first door cam 40 as shown in FIGS. 7 and 8, it semi-automatically rotates the camera door 30. The camera door 30 then opens the lens hole 21 as shown in FIG. 8. The reflection plate 31, which is positioned on the surface of the camera door 30, can now be used as a mirror. If a user wants to shut the lens hole 21, the camera door 30 is rotated in the opposite direction about the rotation axis A1 as shown in FIG. 7. The first door cam 40 is then rotated together in a similar manner, as shown in FIGS. 6 and 7. After being released from the second trough 43, the crest 51 reaches the bent point S1 of curvature and passes through it again in the opposite order.

After being inserted into the containing space 24, the second door cam 50 travels linearly toward the first door cam 40 as shown in FIG. 7 and is again inserted into the first trough 42 by the elastic force from the door elastic body 60. The camera door 30 is then semi-automatically rotated as shown in FIGS. 4 and 5 to shut the lens hole 21.

As shown in FIG. 7, the second door cam 50 has an escape prevention step 52 formed on each lateral surface thereof to prevent it from escaping from the containing space 24 as it travels linearly therein.

The operation of a camera door opening/shutting apparatus for a portable terminal according to a second embodiment of the present invention, configured as above, will now be described in detail with reference to FIGS. 9 to 15.

As shown in FIGS. 9 to 15, a camera door opening/shutting apparatus 100 for a portable terminal has a door member 200 integrated to a terminal 11 and a lens hole 201 formed in the door member 200. The door member 200 has a camera door 300 therein for opening and shutting the lens hole 201 as being rotated about a rotation axis A1 of a rotation cam 400.

Figure 9:
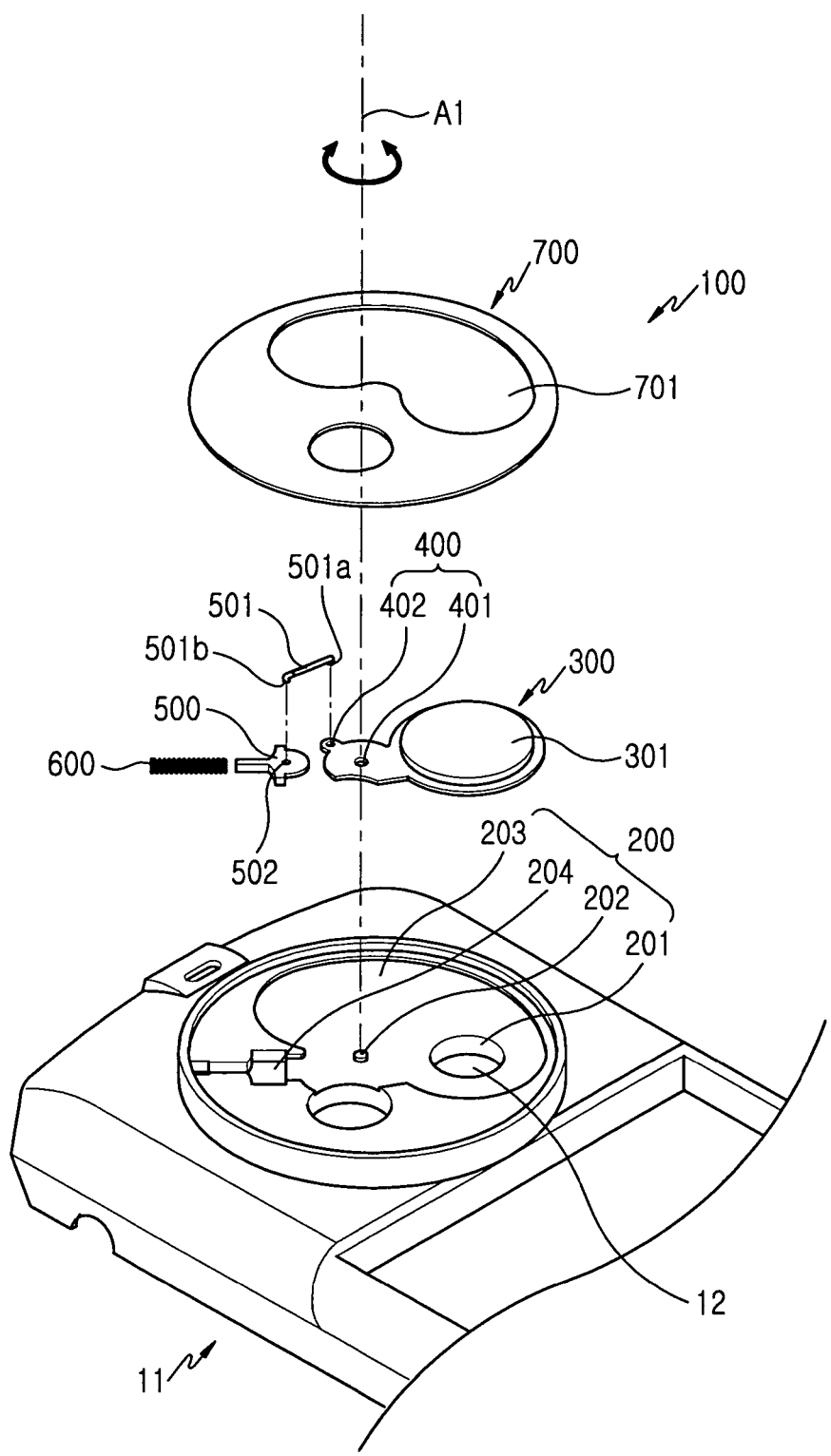
FIG. 9 is an exploded perspective view showing a camera door opening/shutting apparatus for a portable terminal according to a second embodiment of the present invention.
Figure 11:
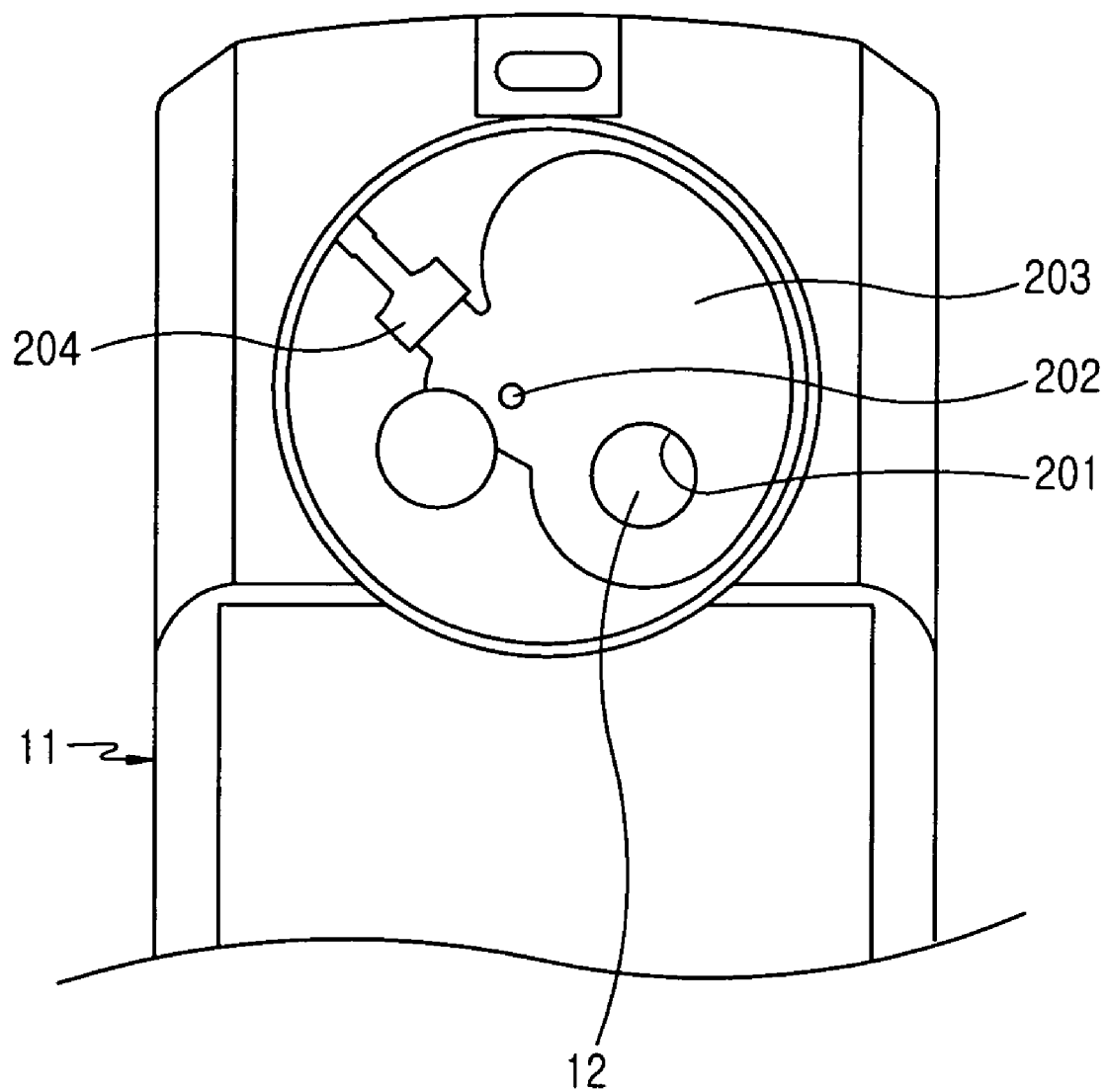
FIG. 11 is a top view showing the interior of a door member of a camera door opening/shutting apparatus for a portable terminal according to a second embodiment of the present invention.

As shown in FIGS. 9 and 11, the rotation cam 400 extends along the circumference of the camera door 300. The camera door 300 and the rotation cam 400 are rotatably contained in a rotation space 203 formed in the door member 200. The rotation cam 400 has a rotation hole 401 formed at the center thereof to be coupled with a rotation protrusion 202 of the door member 200. The rotation cam 400 has a coupling hole 402 formed along the circumference thereof to be coupled with an end 501a of a link bar 501. A link cam 500 has a link hole 502 formed at the center thereof to be coupled with the other end 501b of the link bar 501 and to enable the link bar 501 to be rotated.

Figure 10:
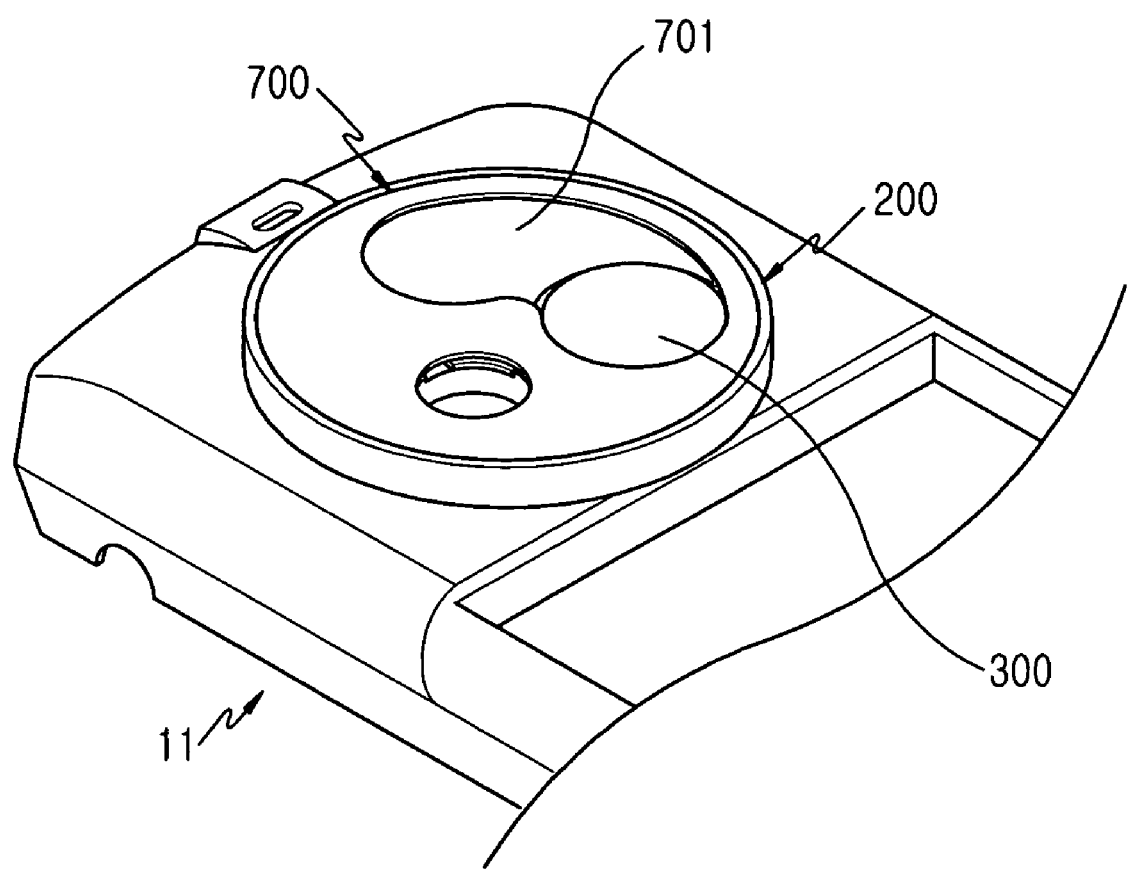
FIG. 10 is an assembled perspective view showing a camera door opening/shutting apparatus for a portable terminal according to a second embodiment of the present invention.
Figure 12:
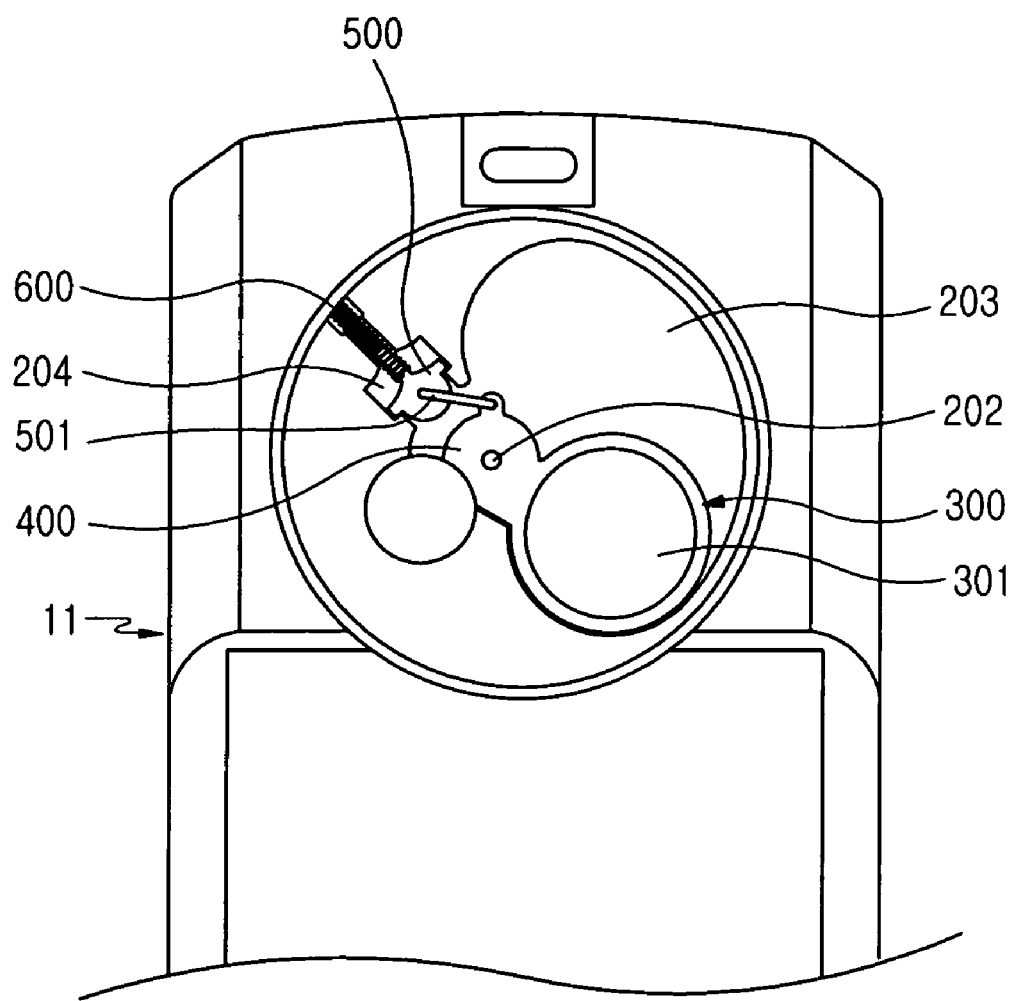
FIG. 12 is a top view showing the construction of a camera door opening/shutting apparatus for a portable terminal according to a second embodiment of the present invention prior to the opening/shutting of a lens hole by a camera door while a door cover is separated.
Figure 13:
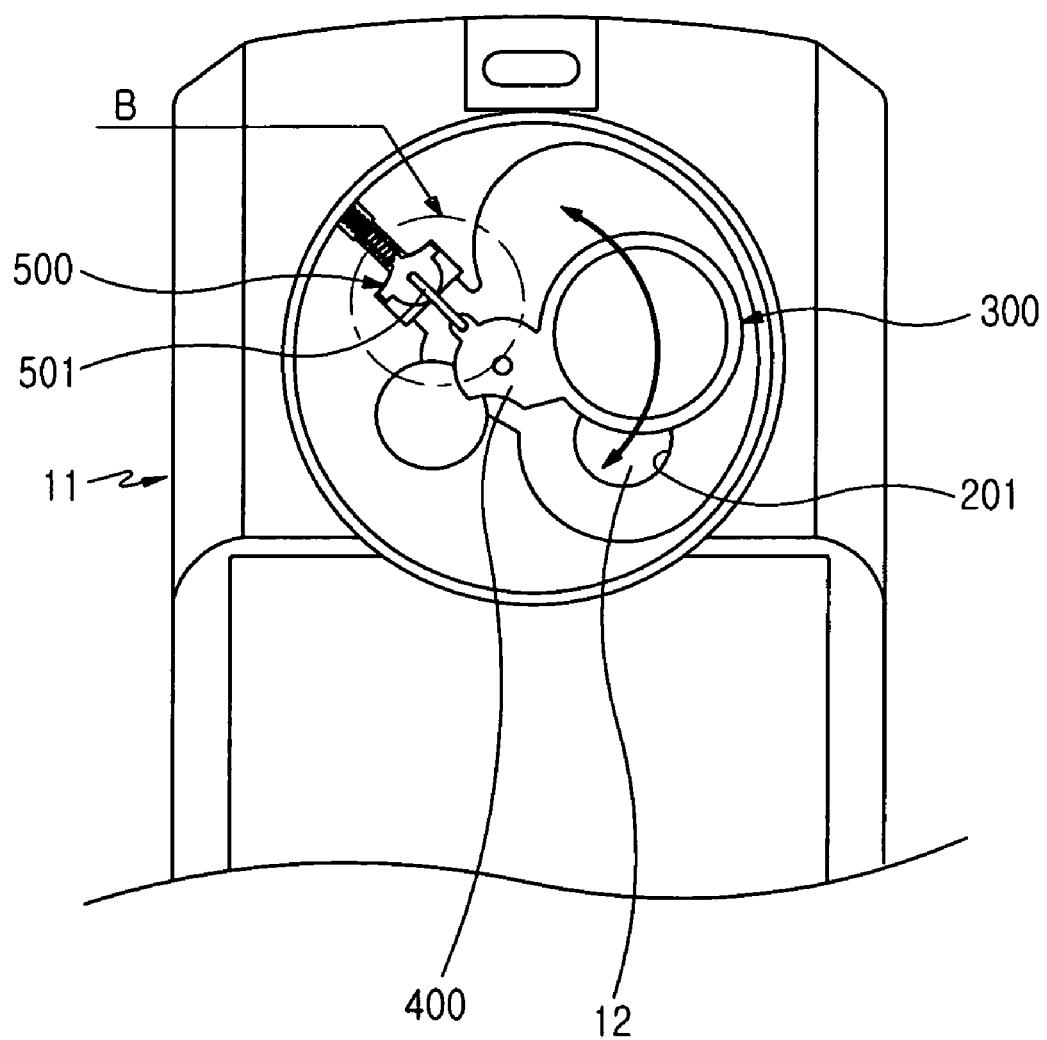
FIG. 13 is a top view showing the construction of a camera door opening/shutting apparatus for a portable terminal according to a second embodiment of the present invention during the opening/shutting of a lens hole by a camera door.
Figure 14:
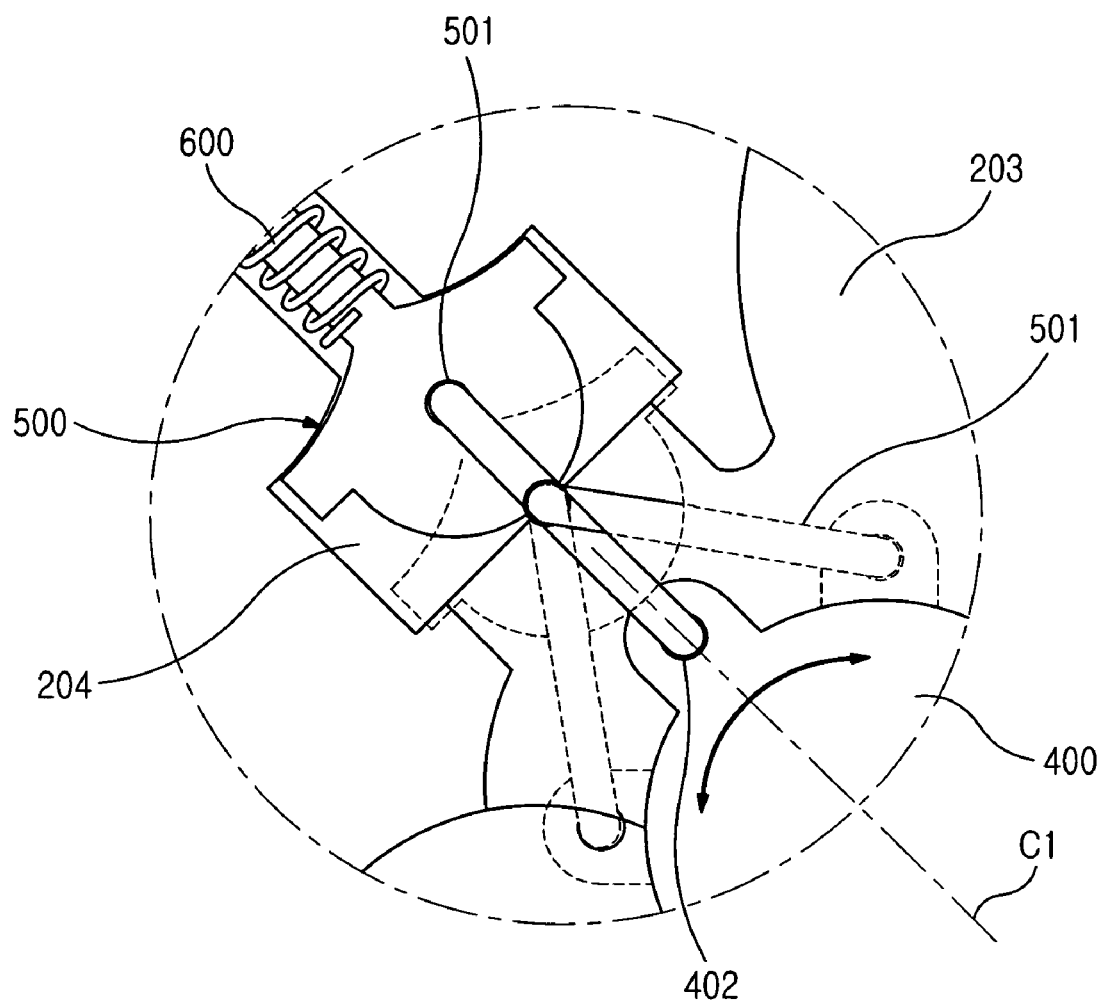
FIG. 14 is a top view magnifying part B of FIG. 13.

As shown in FIGS. 9 and 10, the camera door 300, the rotation cam 400, the link cam 500, the link bar 501, a door elastic body 600, and a door cover 700 are successively coupled on top of the door member 200. If the user wants to open the lens hole 201, the camera door 300 is rotated about the rotation axis A1 as shown in FIG. 12. The rotation cam 400 is then rotated together with the camera door 300 as shown in FIGS. 12 and 13. The rotation cam 400 extends along the circumference of the camera door 300. As the rotation 400 is rotated together with the camera door 300, the link bar 501 is rotated accordingly as shown in FIGS. 13 and 14, because the rotation cam 400 is connected to the link cam 500 by the link bar 501. The link bar 501 is then rotated past a rotation peak C1, as shown in FIG. 14.

The rotation of the link bar 501 causes the link cam 500 to be inserted into the containing space 204, because the link cam 500 is positioned in the containing space 204 of the door member 200.

When the link bar 501 reaches the rotation peak C1 and passes it as shown in FIG. 14, the door elastic body 600 positioned in the containing space 204 provides an elastic force so that the link cam 500 linearly travels toward the rotation cam 400. The link bar 501 is then rotated to the opposite side relative to the rotation peak C1.

Figure 15:
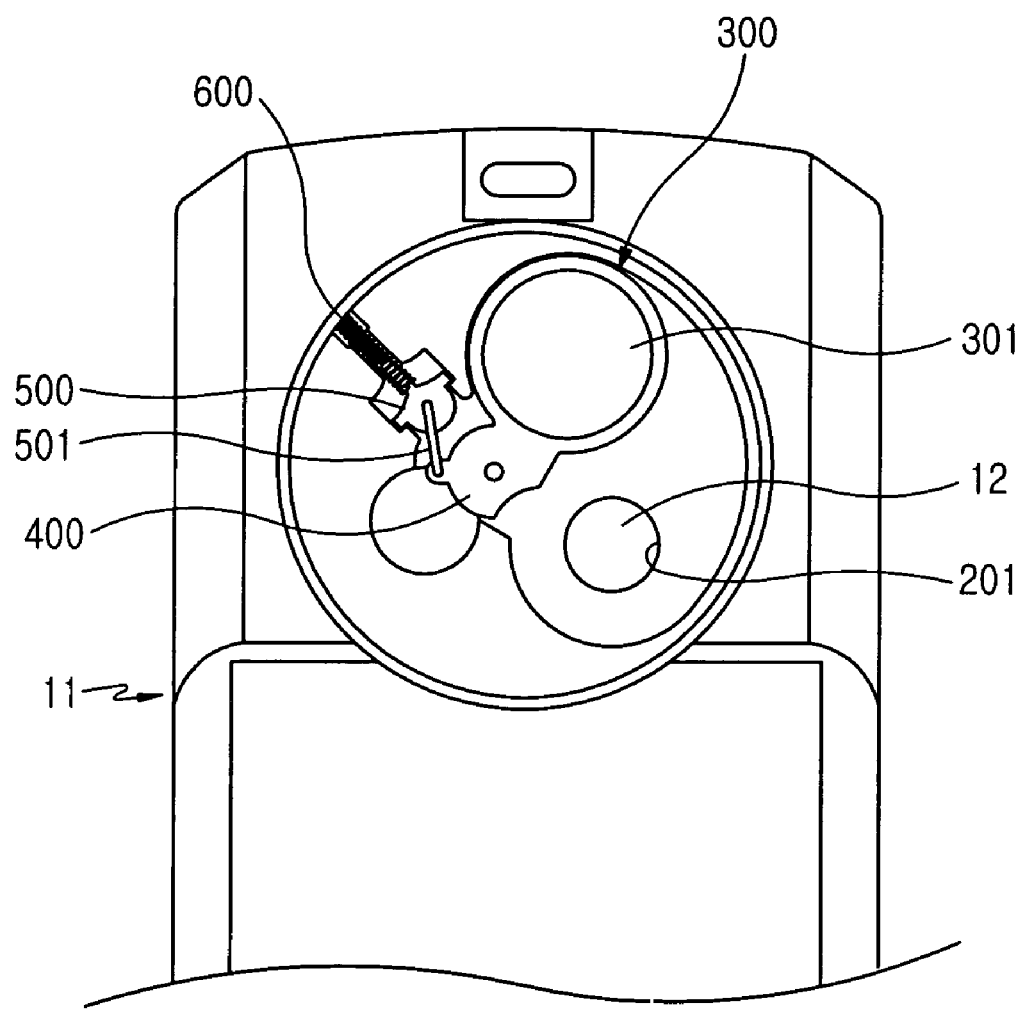
FIG. 15 is a top view showing the construction of a camera door opening/shutting apparatus for a portable terminal according to a second embodiment of the present invention after the opening/shutting of the lens hole by a camera door.

As shown in FIGS. 10 and 15, the camera door 300 is then rotated along an opening 701, which is formed in the door cover 700 in a curved shape, and semi-automatically opens the lens hole 201. A reflection plate 301, which is positioned on the surface of a camera lens 12, can now be used as a mirror. If the lens hole 201 is to be shut, the camera door 300 is again rotated in the opposite direction as shown in FIGS. 12 to 15. The rotation cam 400 is then rotated together as shown in FIG. 14. The link bar 501 is again rotated and passes the rotation peak C1.

As the link cam 500 is inserted into the containing space 204 as shown in FIG. 14, the link bar 501 is rotated past the rotation peak C1. The door elastic body 600 then provides an elastic force so that the link cam 500 linearly travels toward the rotation cam 400 as shown in FIG. 12. The link bar 500 is then pressed and rotated to its original position. Finally, the camera door 300 semi-automatically returns to its original position and shuts the lens hole 201.

As mentioned above, the camera door opening/shutting apparatus for a portable terminal according to the present invention can semi-automatically open and shut the camera door and makes it possible to use the camera lens of the terminal in a convenient manner.

While the invention has been shown and described with reference to certain preferred embodiments thereof, it will be understood by those skilled in the art that various changes in form and details may be made therein without departing from the spirit and scope of the invention as defined by the appended claims. For example, the present invention is applicable to all portable terminals.

What is claimed is:

1. A camera door opening/shutting apparatus for a portable terminal equipped with a camera lens, the apparatus comprising:
    a door member having a lens hole formed therein;
    a camera door positioned over the door member and adapted to open and shut the lens hole by rotating about a rotation axis;
    a first door cam providing the rotation axis and a trough on a surface thereof, the first door cam extending along the periphery of the camera door and being rotatably connected to the door member;
    a second door cam having a crest formed thereon, facing the trough, and adapted to travel linearly as the first door cam is rotated;
    a door elastic body providing an elastic force so that the second door cam can travel linearly while being pressed toward the first door cam; and
    a door cover positioned on top of the door member and having an opening formed therein allowing the camera door to extend through it and rotate.

2. A camera door opening/shutting apparatus for a portable terminal as claimed in claim 1, wherein the door member has a radial shape and is integral to the terminal.

3. A camera door opening/shutting apparatus for a portable terminal as claimed in claim 1, wherein the door member has a rotation protrusion formed at the center thereof to be rotatably coupled with a rotation hole formed in the first door cam.

4. A camera door opening/shutting apparatus for a portable terminal as claimed in claim 1, wherein the door member has a rotation space formed in the interior thereof for rotatably containing the camera door and the first door cam therein and a containing space formed adjacently to the rotation space for containing the second door cam therein.

5. A camera door opening/shutting apparatus for a portable terminal as claimed in claim 1, wherein the camera door has a reflection plate formed on the external surface thereof, which acts as a mirror.

6. A camera door opening/shutting apparatus for a portable terminal as claimed in claim 3, wherein the first door cam has a rotation hole formed at the center thereof to be coupled with the rotation protrusion of the door member and first and second troughs formed along the outer periphery of the first door cam to semi-automatically rotate the door, while facing the crest, as the door cam is rotated.

7. A camera door opening/shutting apparatus for a portable terminal as claimed in claim 6, wherein a bent point, which is defined by an area of curvature, is defined between the first and second troughs on the first door cam.

8. A camera door opening/shutting apparatus for a portable terminal as claimed in claim 4, wherein the second door cam has an escape prevention step formed on each lateral surface thereof to prevent it from escaping from the containing space and a support protrusion formed on an end thereof to support the door elastic body.

9. A camera door opening/shutting apparatus for a portable terminal as claimed in claim 1, wherein the opening is formed in a curved shape along the periphery of the door cover.

10. A camera door opening/shutting apparatus for a portable terminal as claimed in claim 7, wherein when the camera door is rotated about the rotation axis to open the lens hole, the first door cam is rotated together with the door, after disengaging from the first trough of the first door cam, the crest of the second door cam passes the bent point of curvature, an elastic force from the door elastic body causes the second door cam to linearly travel toward the first door cam and the crest to be inserted into the second trough, and thereby the door is semi-automatically rotated and the lens hole is opened, and when the camera door is rotated in the opposite direction to shut the lens hole, the first door cam is rotated, after disengaging from the second trough, the crest reaches and passes the bent point, the crest is again inserted into the first trough by the door elastic body; and thereby the door is semi-automatically rotated and returns to its original position.

11. A camera door opening/shutting apparatus for a portable terminal equipped with a camera lens, the apparatus comprising:
a door member having a lens hole formed therein;
a camera door positioned over the door member and adapted to open and shut the lens hole by rotating about a rotation axis;
a rotation cam providing the rotation axis, the rotation cam extending along the periphery of the camera door and rotatably connected to the door member;
a link cam connected to the rotation cam by a link bar and adapted to linearly travel as the link bar is rotated by the rotation of the rotation cam;
a door elastic body providing an elastic force forcing the link cam to travel linearly while being pressed toward the rotation cam; and
a door cover positioned over the door member and having an opening formed therein allowing the camera door to extend through it and rotate.

12. A camera door opening/shutting apparatus for a portable terminal as claimed in claim 11, wherein the door member has a radial shape and is integral to the terminal.

13. A camera door opening/shutting apparatus for a portable terminal as claimed in claim 11, wherein the door member has a rotation protrusion formed at the center thereof to be rotatably coupled with a rotation hole formed in the rotation cam.

14. A camera door opening/shutting apparatus for a portable terminal as claimed in claim 11, wherein the door member has a rotation space formed in the interior thereof for rotatably containing the camera door and the rotation cam therein and a containing space formed adjacently to the rotation space for containing the link cam therein.

15. A camera door opening/shutting apparatus for a portable terminal as claimed in claim 11, wherein the camera door has a reflection plate formed on the external surface thereof, which acts as a mirror.

16. A camera door opening/shutting apparatus for a portable terminal as claimed in claim 13, wherein the rotation cam has a rotation hole formed at the center thereof to be coupled with the rotation protrusion of the door member and a coupling hole formed along the circumference thereof to be coupled with the link bar.

17. A camera door opening/shutting apparatus for a portable terminal as claimed in claim 11, wherein the link cam has a link hole formed at the center thereof to be coupled with the link bar allowing the link bar to rotate.

18. A camera door opening/shutting apparatus for a portable terminal as claimed in claim 11, wherein an end of the link bar is coupled to a coupling hole formed along the circumference of the rotation cam and the other end thereof is coupled to a link hole formed at the center of the link cam.

19. A camera door opening/shutting apparatus for a portable terminal as claimed in claim 11, wherein when the camera door is rotated about the rotation axis to open the lens hole, the rotation cam is rotated together with the door, the link bar, which is connected to the link cam, reaches and passes a rotation peak, an elastic force from the door elastic body causes the link cam to linearly travel toward the rotation cam, the link bar is rotated to the opposite side of the rotation peak; and thereby the door is semi-automatically rotated, and when the camera door is rotated in the opposite direction to shut the lens hole, the rotation cam is rotated, the link bar again passes the rotation peak, the door elastic body causes the link cam to travel linearly and the link bar to be rotated; and thereby the door semi-automatically returns to its original position.

* * * * *